S. RUST.

Lamp Burner.

No. 76.

Reissued Aug. 16, 1845.

N. PETERS, Photo-Lithographer, Washington, D. C.

UNITED STATES PATENT OFFICE.

SAMUEL RUST, OF NEW YORK, N. Y.

IMPROVEMENT IN LAMP-WICKS.

Specification forming part of Letters Patent No. 4,040, dated May 10, 1845; antedated April 4, 1845; Reissue No. 76, dated August 16, 1845.

*To all whom it may concern:*

Be it known that I, SAMUEL RUST, of the city of New York, county and State of New York, have invented a new and useful improvement in lamp wicks to be used in lamps for lighting houses, stores, and other places; and I do hereby declare that the following is a full and exact description thereof as invented or improved by me.

Figure 1:
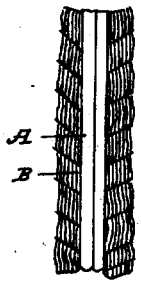
Figure 2:
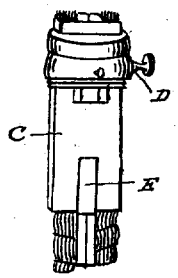
Figure 3:
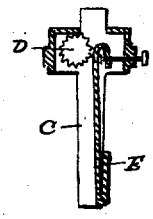
Figure 7:
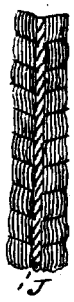

This wick is made of a flat form, but is thinner along the middle than at its sides, and is peculiarly well adapted for lamps which raise or depress the wick by a roller. It consists or is made, in part, of a length of twine or of a narrow strip of tape about one-fourth of an inch wide, (more or less,) or of muslin, canton-flannel, or any other material, or may be made in any other way so as to form a strip of thin close or hard substance in the center for the roller to act upon lengthwise. The muslin or canton-flannel may be made one-fourth of an inch wide, the same as the tape, or it may be a half of an inch wide, with the edges turned and doubled over so as to meet in the center, as shown at A, Figure 1, which prevents it from raveling, and which, when doubled, forms a strip the same width as the tape. Onto each edge or side of this strip candle-wick, (or any other wick-like substance,) made thick, loose, or open, to conduct the oil, is woven, sewed, or in any other way attached, as at B, Fig. 1. The twine may be used singly, as shown at J, Fig. 7, or several strands thereof may be used and woven in between the two candle-wicks to form the strip for the roller to act upon in place of the tape, muslin, or canton-flannel, as described, and shown in Fig. 1. This wick is admirably adapted for use in my spring-lamps, with a thumb-piece, formerly patented by me, which has a flat tube, as shown at C, Fig. 2, and C, Fig. 3, and a narrow wheel or roller in the center of the side of the tube, as at D, Fig. 2, and D, Fig. 3, about one-fourth of an inch wide, and a narrow spring, about the same width as the roller, soldered onto the tube, on the side opposite to the roller, as at E, Fig. 2, and E, Fig. 3, which spring and roller both act on the strip in the center of the wick as described in my Letters Patent, the spring on the one side and the roller on the other, without touching the candle-wick on either edge. This strip in the center, being close and hard, cannot catch or hook in the teeth of the roller, as is the case with the loose-woven flat wick, while the sides of my improved wick, being of the nature of candle-wick, which is made thick, loose, and open, so as to conduct the oil freely, burns up boldly and beautifully at the sides, making a clear and splendid light, the candle-wick, being left thick, loose, and open on the sides, serving as a full and complete conductor of the oil, and the strip in the center serving for the roller to act upon, as described, both of which perform their full and complete office as intended.

Figure 4:
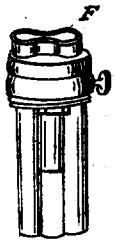

This wick burns much better when the oil is low in the lamp than the old woven flat wick, and is not so liable to go out by moving around. When used in the flat tube as above described, it will flatten and form itself into a perfect flat wick, connecting the whole blaze in one sheet, while it is also calculated for two round tubes connected together by a narrow space in the center, as at F, Fig. 4, which tube I am now about to patent in another separate patent, in which it will be more fully set forth. While this wick, made the same in size and in the same way, will spread out and fit the wide flat tube, as described, it will also close up by its yielding nature and fit these two narrow round tubes, so that I use the same wick both as a close round wick and also as a wide flat wick. This wick I also make the same, and is the same thing without doubling over the edges of the muslin or the canton-flannel by leaving the muslin or the canton-flannel its full width, as described, or the width of the inside of the flat tube, and sew or otherwise attach a quarter of the candle-wick on both sides of each edge, so as to still leave the strip in the center for the roller to act upon. The candle-wick is in this case divided into four equal parts.

Figure 5:
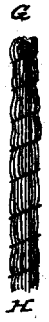
Figure 6:
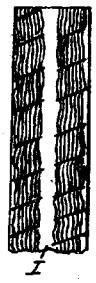

G, Fig. 5, is the edge view of the muslin or canton-flannel. H, Fig. 5, is also the edge view of the candle-wick sewed on each side of each edge of the muslin or canton-flannel; or, the candle-wick may be sewed half on one side of the strip of muslin or canton-flannel and half on the same side of the other edge, leaving the strip, or a place in the center, in either case between the two candle-wicks for the roller to work, as at I, Fig. 6, this being the same as A, Fig. 1.

What I claim as new in the above-described wick, and desire to secure by Letters Patent, is—

The lamp-wick made or combined with twine, a strip of tape, muslin, canton-flannel, or other analogous substance so as to form the strip of a thin, close, or hard substance in the center for the roller to act upon, and to form a thick, loose, or open substance of candle-wick or other analogous material on each edge or side for the oil or other fluid to ascend up, in the manner and for the purpose above set forth, or in any other way that is substantially the same.

Witness my hand this 15th day of July, A. D. 1884.

SAMUEL RUST.

In presence of—
SARAH ANN RUST,
JOHN N. RUST.